United States Patent [19]
Doll

[11] Patent Number: 5,400,660
[45] Date of Patent: Mar. 28, 1995

[54] INDUCTIVE FLOW METER

[75] Inventor: Friedhelm Doll, Wermelskirchen, Germany

[73] Assignee: Turbo-Werk Messtechnik GmbH, Cologne, Germany

[21] Appl. No.: 125,927

[22] Filed: Sep. 23, 1993

[30] Foreign Application Priority Data

Nov. 6, 1992 [EP] European Pat. Off. ............ 92119006

[51] Int. Cl.⁶ ................................................ G01F 1/00
[52] U.S. Cl. .................................. 73/861.17; 73/861.12
[58] Field of Search ............ 73/861.12, 861.16, 861.17

[56] References Cited

U.S. PATENT DOCUMENTS

| | | | |
|---|---|---|---|
| 3,764,895 | 10/1973 | DiMarco | 73/861.16 |
| 4,601,209 | 7/1986 | Amata | 73/861.17 |
| 4,644,799 | 2/1987 | Tomita | 73/861.17 |
| 4,704,907 | 11/1987 | Mannherz et al. | 73/861.17 |
| 5,018,391 | 5/1991 | Doll | 73/861.17 |

Primary Examiner—Richard E. Chilcot, Jr.
Assistant Examiner—Ronald L. Biegel
Attorney, Agent, or Firm—Spensley Horn Jubas & Lubitz

[57] ABSTRACT

In an inductive flow meter, the magnetic field generator that generates a magnetic field within a tube, is connected to a source of alternating voltage via an electronic switch. The switch is controlled such that it becomes conductive only upon a zero crossing of the alternating voltage, respectively, and remains conductive until the next successive zero crossing of the exciting current. The useful voltage taken at the electrodes is integrated in an integrator, whereby the parasitic voltage coupled into the electrode loop by self induction becomes zero. In order to eliminate the influences of retentivity, each current pulse, at which integration is performed, is preceded by a pre-pulse.

1 Claim, 2 Drawing Sheets

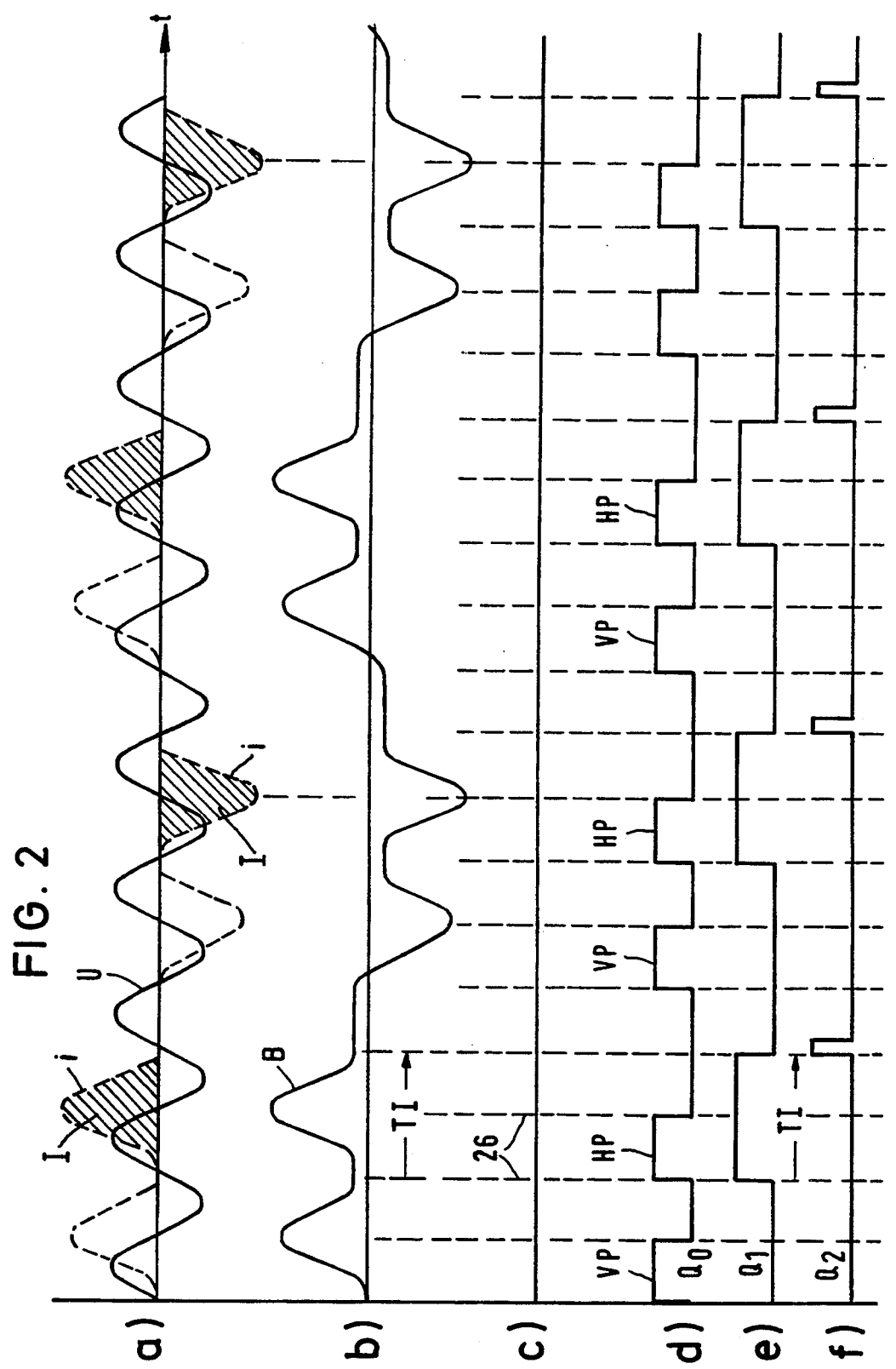

INDUCTIVE FLOW METER

BACKGROUND OF THE INVENTION

The invention relates to an inductive flow meter wherein a transversely directed magnetic field is generated within a tube, the magnetic field, together with an electrically conductive liquid flowing in the tube, generating a voltage which is detected by electrodes arranged at said tube and is evaluated. Such an inductive flow meter is known, among others, from US Pat. No. 5,018,391 to Doll.

In the above mentioned known flow meter, positive and negative exciting currents are generated alternatingly in the magnetic field generator, the currents in turn generating a magnetic flux density B within the tube. The exciting current flows for less than one cycle of the applied alternating voltage, respectively. In an evaluating circuit connected to the electrodes, the integral with respect to the respective cycle of the alternating voltage is formed. Since the forming of the integral is performed for exactly one cycle, parasitic voltages coupled in from the mains and having the same frequency as the exciting voltage are compensated. The value of the integral at the end of the mains cycle is supplied to a differential amplifier supplying the useful signal which may afterwards be freed from further parasitic signals. The principle of the known flow meter is based on the fact that the magnetic flow density $B_2$ at the end of the cycle used for forming the integral is equal to the magnetic flow density $B_1$ at the beginning of the excitation. However, in practice, this condition is met only approximately. While the exciting current is zero at the beginning and the end of the integration time, the flux density B is not. This is due to the retentivity inherent to the iron of the magnetic field generator. This retentivity has the effect that, at the beginning of the integration interval, the flux density still has a value derived from the previous exciting pulse of opposite polarity and falsifying the measuring result, since the integral of the inductive parasitic voltage $$\int_1^2 \frac{dB}{dt} dt = B_2 - B_1$$

will be eliminated only if $B_2 = B_1$.

SUMMARY OF THE INVENTION

It is an object of the invention to provide a flow meter in which integrals are formed over an integral cycle of the exciting voltage, with no measuring errors being caused by retentivity or eddy currents.

The flow meter of the present invention corresponds in its general structure and its effect to that of U.S. Pat. No. 5,018,391. Different from this known flow meter, however, a pre-pulse is generated prior to each integration time, the pre-pulse having the same polarity as the pulse in the successive integration time in which the integral is formed and the evaluation is made. The pre-pulse erases the "memory" of a previous pulse of opposite polarity and the magnetic field generator is prepared for the polarity of the next measuring pulse. Thus, it is achieved that at the beginning and at the end of each measuring pulse the values of the flux density are equal (although they are other than zero) so that no difference falsifying the result of the measure exists.

Although a single pre-pulse is sufficient before each integration time, also a plurality of pre-pulses may be generated, e.g., from one to four pre-pulses. On the other hand, a pre-pulse could also be followed by a plurality of measuring pulses, e.g., 2, 3 or 4, which would then be evaluated with a correspondingly longer integration time.

BRIEF DESCRIPTION OF THE DRAWINGS

The following is a detailed description of an embodiment of the invention taken in conjunction with the accompanying drawings.

In the Figures

FIG. 2 is a diagram of different signals occurring in the circuit of FIG. 1.

DESCRIPTION OF THE PREFERRED EMBODIMENT

Figure 1:
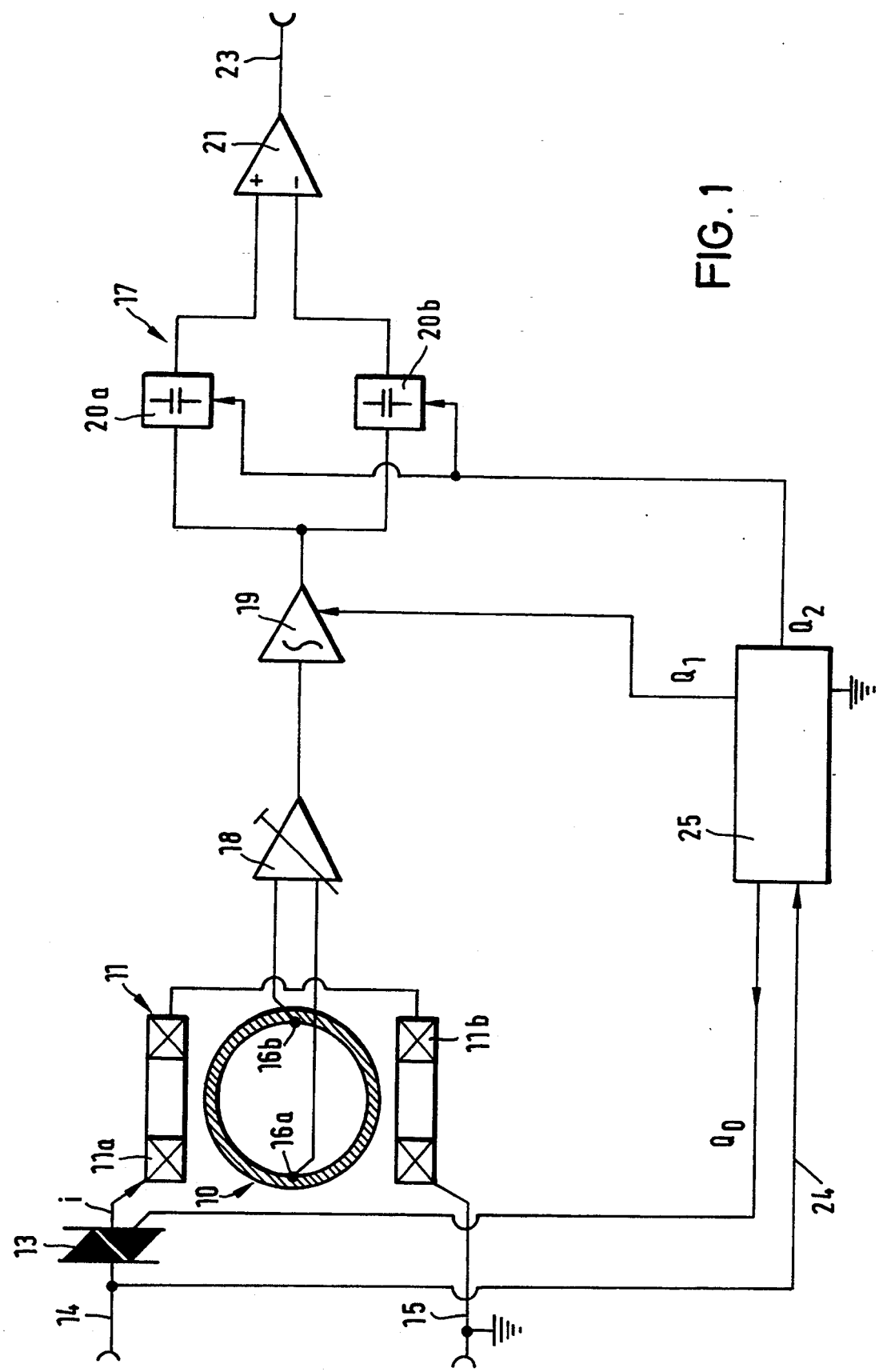
FIG. 1 is a schematic block diagram of the inductive flow meter.

In a manner known per se, the flow meter comprises a tube 10 of a non-conductive material, in which flows the liquid, the flow rate of which is to be measured. The tube 10 is provided with the magnetic field generator 11 which in the present case comprises two coils 11a and 11b being arranged coaxially with respect to each other at opposite sides of the tube and being electrically connected in series. An exciting current flowing through both coils 11a, 11b, generates a magnetic field inside the tube 10 that extends transversely through the interior of the tube.

Connected in series to the electronic switch 13, the series connection of the coils 11a and 11b is connected to the supply network through the lines 14 and 15 so that the series connection of switch 13 and coils 11a and 11b may be connected directly to the power supply of, e.g., 220 V and 50 Hz.

At the inner wall of the tube 10, two electrodes 16a, 16b connected to the evaluating circuit 17 are arranged opposite each other.

The evaluating circuit 17 comprises an amplifier 18 connected to the electrodes 16a, 16b, the signal of which is supplied to an integrator 19. The output signal of the integrator 19 is supplied to two sample and hold circuits 20a and 20b, the outputs of which are connected to the two inputs of a differential amplifier 21. The output signal 23 of the differential amplifier 21 is proportional to the flow rate of the liquid in the tube 10.

The amplitude of the alternating voltage on line 14 is supplied to the control electronics 25 via the line 24. This control electronics includes a zero crossing detector which generates a pulse upon each zero crossing of the alternating voltage. The top line a) of FIG. 2 illustrates the course in time of the alternating voltage on lines 14 and 15, being designated as U. Line c) shows the needle pulses 26 generated by the zero crossing detector during the respective zero crossings of the alternating voltage U.

In the top line a) of FIG. 2, the course of the exciting current flowing through the magnetic field generator 11 is referenced as i. The electronic switch 13 in the form of a triac is controlled by the control electronics 25 through pulses $Q_0$ supplied to the gate thereof, such that it is controlled to the conductive state during each respective zero crossing of the alternating voltage. The triac remains in the conductive state until the current i, which is phase shifted with respect to the alternating current U, has become zero. Thyristors or triacs are known to be controlled to the conductive state when the main current becomes zero without there being a control voltage present at the gate. According to FIG. 2d), the signal $Q_0$ extends over one half-wave of the alternating voltage U. Thus, the triac 13 may take the reversed state in the next half-wave, when the current i becomes zero.

In the present embodiment, a second pulse $Q_0$ is generated after the first pulse $Q_0$ during the second zero crossing of the alternating voltage U, and three zero crossings after the beginning thereof, a first pulse $Q_0$ is generated again, etc. The first pulse is a pre-pulse VP, respectively, which appears one cycle of the alternating voltage before the main pulse HP.

In dependence on the zero crossing signals 26, the control electronics 25 generates the pulses $Q_1$, illustrated in line e) of FIG. 2, which last for one cycle of the alternating voltage U, i.e., for one positive and one negative half-wave. Each pulse $Q_1$ starts with the zero crossing of the alternating voltage U at which the triac 13 is controlled to the conductive state by a main pulse HP. These pulses $Q_1$ control the integrator 19 such that it performs integration only during the integration times TI defined by the pulses $Q_1$ and that its output signal is then reset obligatorily. Since parasitic voltages occurring have the frequency of the alternating voltage U (or a multiple thereof), the integral of this parasitic voltage becomes zero over one full cycle of the alternating voltage. In contrast thereto, the integral of the intensity of the magnetic field within the respective cycle yields the value B, the magnitude of which corresponds to the hatched area in FIG. 2b. The useful voltage produced at the electrodes 16a and 16b is proportional to the area B. At the end of each signal $Q_1$, a useful signal is present at the output of the integrator 19, the magnitude thereof corresponding to the flow velocity and the integral B with respect to time of the immediately preceding field pulse. This output value of the integrator 19 is supplied to a sample and hold circuit 20a or 20b while being clocked by the signal $Q_2$ generated by the control electronics. The signal $Q_2$ is a short pulse generated immediately after the end of signal $Q_1$. The signals $Q_2$ are timed such that a respective one of these signals alternatingly activates the sample and hold circuit 20a, while the next signal activates the sample and hold circuit 20b. Thus, the positive useful signals, which in FIG. 2b) lie above the time axis t, are latched into the sample and hold circuit 20a, whereas the negative time integrals that lie below the time axis t are latched into the sample and hold circuit 20b. It is the function of the sample and hold circuits to accept and latch the respective output signal of the integrator 19 upon a pulse $Q_2$ and to keep it latched until the next successive pulse $Q_2$.

The positive input of the differential amplifier 21 is connected with the sample and hold circuit 20a and its negative input is connected with the sample and hold circuit 20b. Since the value contained in the sample and hold circuit 20b is negative, the differential amplifier 21 adds the two amounts of the contents of the sample and hold circuits. At the output of the differential amplifier 21, a voltage arises which is proportional to the voltage between the electrodes 16a and 16b and represents the measured result.

Line b) in FIG. 2 represents the course of the magnetic flux density B of the magnetic field generator 11. While the signal $Q_0$ performs a pre-pulse VP, the retentivity is inverted in polarity, so to say, and set to the polarity of the half-wave of the alternating voltage U prevailing during the pre-pulse VP. In this phase, the integrator 19 is still inactive. The flux density B rises, e.g., from the negative region, takes its positive maximum and falls with the exciting current i. When the exciting current i has become zero, a retentivity value of the flux density B larger than zero will remain. Upon the next main pulse HP of the signal $Q_0$, the flux density will rise from this retentivity value, only to fall to the same value thereafter. Thus, the integration time TI ends with the same value of the flux density B it began with. It will be appreciated that the flux density B rises to a lower value during the pre-pulse VP than it does during the main pulse HP. In the successive polarity inversion, first, a pre-pulse is performed with a negative direction of current and then a main pulse is performed, also with a negative direction of current. For the proper measuring interval, i.e., the integration time TI, only the portion with the main pulse HP is evaluated.

I claim:

1. An inductive flow metering method, comprising: providing a magnetic field generator,
connecting the magnetic field generator to an alternating voltage via an electronic switch,
providing a pair of electrodes,
providing a control circuit having a zero crossing detector for detecting zero crossings of the alternating voltage,
controlling the switch via the control circuit so that the switch assumes a conductive state at a zero crossing of the alternating voltage and is switched out at a zero crossing of an exciting current,
connecting an integrator to the electrodes,
integrating electrode voltage over an integration period equal to at least one cycle of the alternating voltage, the integration period starting substantially simultaneously with the switch assuming a conductive state, and
generating a pre-pulse of the switch prior to the integration period, during which the integrator is inactive and the switch carries current of the same polarity as during the integration period.

* * * * *